Patented Nov. 19, 1940

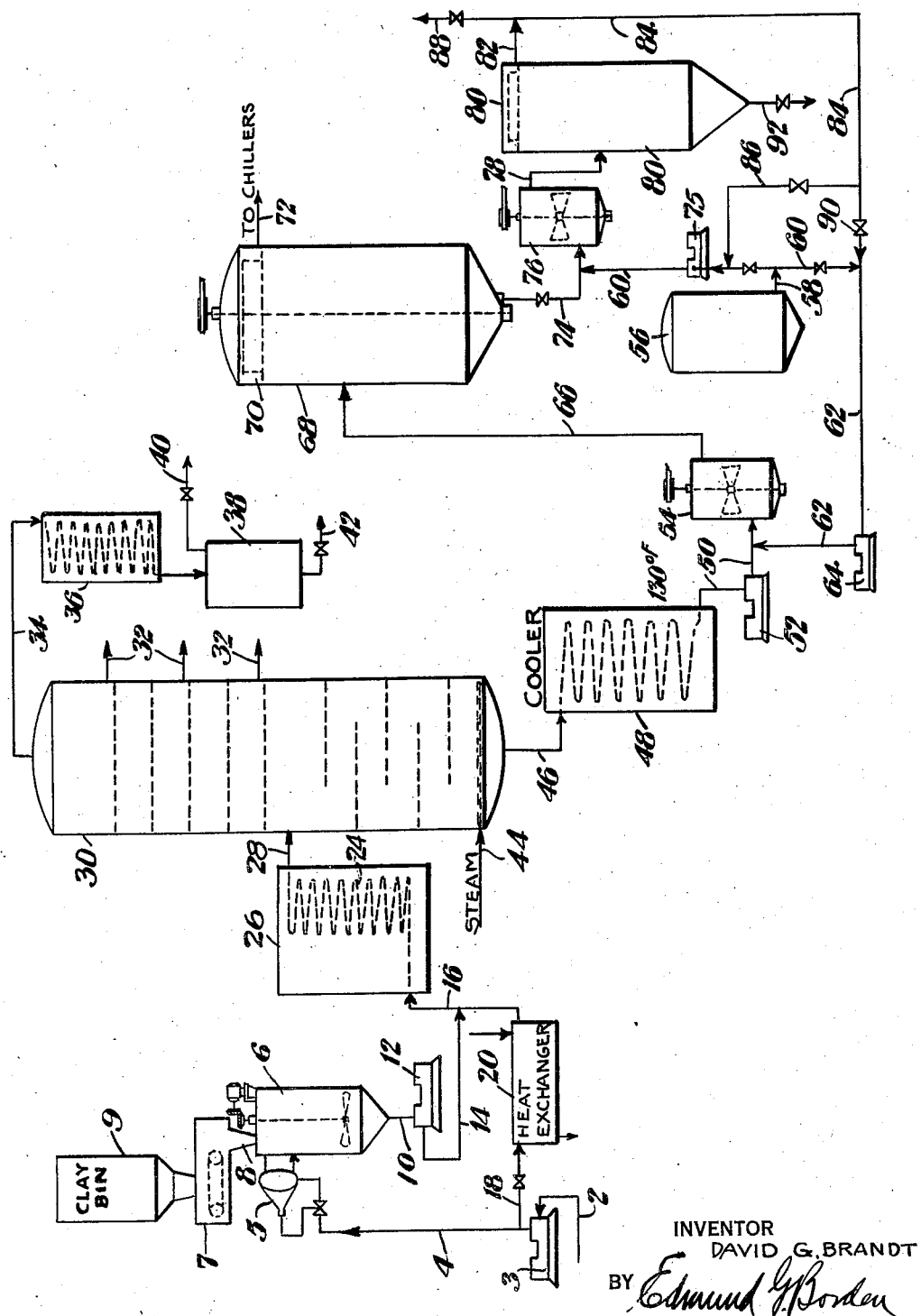

2,222,475

UNITED STATES PATENT OFFICE 2,222,475

PROCESS FOR REFINING LUBRICATING OIL STOCKS

David G. Brandt, Westfield, N. J., assignor to Power Patents Company, Hillside, N. J., a corporation of Maine Application August 10, 1937, Serial No. 158,282

11 Claims. (Cl. 196—34)

This invention relates to improvements in the clay treatment of petroleum oils and more particularly to the removal of clay from oil in the treatment of lubricating oil stocks by the contact method.

In the contact treatment of lubricating oil stocks, it is the usual practice to remove the finely divided clay from the treated oil by passing the mixture through filter presses. The mixture of finely divided clay and relatively heavy oils resulting from such treatment are very expensive to filter because a single filter has a relatively small capacity. The separation of the finely divided clay from the oil is expensive both because high pressure filters must be used and because of the power and labor charges involved.

The primary object therefore of the present invention is to provide certain improvements in such processes by which the difficulties and expense involved are largely eliminated.

A further object of the invention is to provide a process for refining lubricating oil stocks with clay in which the necessity of expensive filters for clay removal is eliminated.

In accordance with the objects of the present invention, the invention comprises an improvement in the process of mixing of finely ground adsorbent clay with a petroleum oil stock such as a long residuum, heating the resulting mixture to the desired reaction temperature, and separating from the mixture certain of the lower boiling constituents of the oil, passing the mixture of clay and unvaporized lubricating oil constituents through a cooling zone and therein cooling the oil to a relatively low temperature, and separating the clay from the oil by the steps of mixing with the cooled oil a substantial proportion of liquid normally gaseous hydrocarbon, introducing the resulting mixture into a precipitation zone in which the clay particles are rapidly separated from the mixture of lubricating oil constituents and light hydrocarbon, and separating the added hydrocarbon from the clay and oil.

The improved process of the present invention includes other features, objects and advantages which will be more clearly apparent from the following detailed description taken in connection with the accompanying drawing in which:

The figure is a diagrammatic flow sheet of an assembly of apparatus elements particularly adapted for carrying out the improved process of the present invention.

Referring to the drawing, the petroleum oil stock to be refined which may be an asphalt-free crude oil, lubricating oil cut, long residuum or other oil residue is introduced into the system through a line 2 and pump 3. A portion of this oil sufficient to form a clay slurry, is passed through a float valve controlled line 4 and a float controller 5 into a clay mixing chamber 6, into which finely ground clay from a weigher 7 is introduced through a conduit 8. Clay is supplied to the weigher 7 from a clay bin 9. The resulting clay-oil mixture is withdrawn through a line 10 from the mixer 6 and passed by means of a pump 12 and a line 14 into a line 16. The portion of the feed oil to be treated which is not mixed with the clay in mixer 6 is conducted from the line 4 through a valved line 18 and a heat exchanger 20 into the line 16 where it mixes with the slurry from line 14.

The oil-clay mixture is conducted through the line 16 and passed through a heating coil 24 mounted in a pipe still furnace 26. The oil in passing through the coil 24 is heated to the desired reaction temperature which may vary from 550° F. to 850° F., depending on the character of the oil and the efficiency of the clay being used. The oil mixture is maintained in the coil 24 for a sufficient length of time to carry out the reaction and give the adsorbent clay sufficient time to act on the undesirable constituents contained in the oil. The mixture is then discharged through a transfer line 28 into a separating or fractionating tower 30 in which the lower boiling point constituents of oil being treated are vaporized and separated from the heavier oil constituents and clay. If desired the tower 30 may be maintained under any degree of vacuum for the fractional separation of overhead lubricants or wax distillates when lubricating oil stocks are being treated. In the treatment of crude oils, the lighter fractions such as gasoline, kerosene, furnace oil and gas oil are vaporized and the heavier fractions condensed in the tower are withdrawn as side streams through the lines 32. The lines 32 preferably lead to the usual side stream strippers where the light ends are stripped from the side cuts by means of steam. The lowest boiling fraction is passed overhead as a vapor through line 34, condensed in a condenser 36 and collected in a receiver 38. A vacuum may be maintained on the receiver 38 through a valved line 40 when lubricating oil stocks are being treated. The condensed product is withdrawn through a valved line 42. In the treatment of crude petroleum the product withdrawn through the line 42 will of course be a gasoline fraction.

The unvaporized oil constituents which remain mixed in the clay in the tower 30 pass downwardly through the lower part thereof over baffle plates and are finally stripped of light constituents by means of steam distributed into the lower part of the tower through a line 44. The oil-clay mixture reaching the bottom of the tower 30 comprises the heavier lubricating constituents and is withdrawn through a line 46 and passed through a cooler 48 in which the temperature of the oil is reduced to about 130° F. or higher so that any wax will remain in solution after a solvent is added. The cooled oil-clay mixture is drawn from the cooler 48 through a line 50 in which is mounted a pump 52 and forced into a dilution mixer 54.

The oil-clay mixture passed through the line 50 is a very viscous high gravity material in which the clay would remain in suspension a very long time. In accordance with the features of the improved process liquid propane, butane or other similar low boiling, normally gaseous hydrocarbon or mixture, is withdrawn from a supply chamber 56 and passed through lines 58, 60 and 62, in the latter of which is mounted a pump 64, and introduced into the line 50 where it is mingled in regulated proportion with the heavy oil-clay mixture. The resulting diluted oil mixture passes into the mixer 54 in which the propane or other similar hydrocarbon is intimately mixed with the clay and heavy oil. The final mixture is relatively fluid and the gravity of the oil very substantially reduced. This mixture is conducted through a line 66 into an enlarged precipitating chamber 68 in which the clay is rapidly settled leaving a clay-free diluted oil. The temperature of the mixture formed in 54 may be controlled by the cooler 48, but will be only slightly below the boiling point of the diluent for the pressure used, which may be several hundred pounds per square inch.

The precipitating chamber 68 may include the usual inside trays and sweeps of a thickener but in the usual case the viscosity and gravity of the oil mixture have been lowered to such an extent by the addition of the propane or butane that the clay particles (usually very fine such as 200 mesh) settle out like sand out of water. The clean diluted oil separated in the chamber 68 overflows into an annular trough 70 and is withdrawn through a line 72 to a chiller (not shown) used for dewaxing the oil stock. Since the oil contains a very substantial proportion of propane or butane, it may be chilled by permitting the vaporization of a certain proportion of these constituents. The diluent is finally removed from the oil.

The settled clay which gravitates to the bottom of the chamber 68 naturally contains a small amount of the oil-propane mixture and this is withdrawn through a valved line 74 into a mixing chamber 76 in which clay and occluded oil is intimately mixed with an additional quantity of low boiling hydrocarbon withdrawn from the chamber 56 and passed from the valve line 60 by means of a pump 77 into the line 74. This added propane or other low boiling hydrocarbon serves to dilute the mixture and wash the occluded oil from the clay. The resulting mixture is discharged through a line 78 into a second precipitating chamber 80, where the clay is very rapidly separated from the relatively large proportion of propane containing the relatively small proportion of occluded oil. The propane containing the oil washed from the clay residue is withdrawn from the upper part of precipitator 80 through a line 82.

The propane or butane solution withdrawn from the chamber 80 through the line 82 is preferably conducted through a line 84, a valved line 86 and a portion of the line 60 back to the pump 75 so that it can be recirculated through the mixer 76 and chamber 80. This cycle may be continued for any reasonable length of time until the solution contains an appreciable proportion of dissolved oil. The solution in this cycle may be removed continuously or intermittently through a valved line 88 to a still (not shown) maintained at reduced pressure so that the propane or butane may be flash-distilled from the oil. Where the dilution of the clay in the line 74 and mixer 76 is not sufficient or does not have the effect of removing undesirable constituents from the clay, the solution in the line 84 may be in part conducted through a valve 90 into the line 62 and returned to the mixer 54 to comprise a portion of the propane or butane added to the oil-clay mixture in the line 50. However, the greater proportion of the solution is discharged through the line 82 and is preferably recirculated directly to the mixer 76. This washing operation leaves the clay relatively free from oil so that it may be revivified if desired or discarded without appreciable loss.

The clay precipitated in chamber 80 is withdrawn through a valved line 92 and since it contains a small amount of occluded propane or other light hydrocarbon, it may be discharged into a suitable low pressure still or chamber where the clay is dried by flashing off the hydrocarbon, which is condensed for reuse.

The temperature to which the oil mixture passed through the line 50 is cooled and maintained throughout the clay separation steps should be as high as possible, substantially above normal, depending on the boiling temperature of the diluent and the pressure used. Since the low boiling hydrocarbon such as propane and butane mixed with the oil-clay slurry in mixer 54 is a vapor at normal temperatures, a suitable rather high superatmospheric pressure must be maintained on the apparatus elements 54, 56, 68, 76 and 80 in order to maintain the hydrocarbon in the liquid phase.

In the dewaxing of petroleum oil residues by the use of diluents such as butane and propane, relatively large proportions of these diluents are used so as to give a mixture containing from 50 to 80% of the low boiling hydrocarbon. Approximately these same percentages may be used in making up the mixture in mixer 54 so that the clean diluted oil discharged through the line 72 may be sent directly to the coolers and chillers of the dewaxing apparatus without the addition of any more diluent. The dilution however should not be so great as to remove undesired constituents from the clay, but such constituents are only slightly soluble in propane or butane where they would be more so in naphtha and other solvents.

From the foregoing description of the process of the present invention, it is apparent that the spent clay may be readily separated from the high gravity viscous oil without the use of expensive equipment, regardless of the fact that the clay may be extremely fine such as to pass through a 200 mesh screen. The improved process of the present invention is continuous and requires much less labor and equipment than a filter press operation.

The improved process of the present invention may be carried out in other apparatus than that described above, and it is apparent that various modifications may be made in the process without departing from the spirit of the invention.

Having thus described the invention in its preferred form, what is claimed as new is:

1. The process of refining crude petroleum oil for the production of lubricants, which comprises intimately mixing the crude petroleum with a substantial proportion of a finely ground adsorbent clay, heating the resulting mixture to a temperature sufficient to bring about the desired reaction between the clay and the oil constituents, which temperature is also sufficient to vaporize a substantial proportion of the constituents of the crude oil, passing the resulting heated mixture into a vapor separating zone in which the vapors are released from the mixture leaving the clay and heavier components of the crude oil unvaporized, fractionating the separated vapors to produce a plurality of petroleum oil fractions, passing the resulting mixture of oil residuum and clay from said separating zone through a cooling zone and cooling the mixture to a temperature of approximately 130° F., intimately mixing the cooled mixture with at least an equal quantity of a liquefied normally gaseous hydrocarbon diluent in a mixing zone thereby forming a solution of relatively low specific gravity and viscosity from the oil residuum and the hydrocarbon diluent, passing the resulting solution mixture into a precipitation zone and therein settling out the clay from the oil solution which is recovered free of clay, and maintaining the temperature of the diluted oil residuum in the mixing and precipitation zones sufficiently high to keep the wax content of the oil residuum in solution in the diluted mixture.

2. The process of contact filtering a lubricating oil stock, which comprises mixing the oil stock with the desired amount of finely ground adsorbent clay and heating the resulting mixture to the desired reaction temperature, maintaining the oil-clay mixture at a reaction temperature above 500° F. and not substantially above 850° F. for a time sufficient to bring about the desired reaction between the oil and clay, cooling the oil-clay mixture to a temperature of approximately 130° F. and mixing therewith at least an equal quality of a liquefied normally gaseous hydrocarbon diluent thereby substantially reducing the viscosity of the lubricating oil stock, passing the resulting diluted oil-clay mixture into a settling zone and therein settling out the clay from the oil solution which is recovered free of clay, maintaining the temperature and pressure conditions in the settling zone such that the diluent is maintained in liquid phase, and maintaining the temperature of the diluted oil in the settling zone sufficiently high to keep the wax content of the oil in solution in the diluted mixture.

3. The process defined by claim 2 in which the clay separated from the diluted oil is separately washed with a further quantity of the diluent for the purpose of removing occluded oil from the clay, and utilizing the wash liquor in diluting the cooled clay-oil mixture.

4. In the process of refining lubricating oil stocks in which the stock is mixed with a predetermined proportion of adsorbent clay and the resulting mixture heated to the desired reaction temperature, the improvement which comprises cooling the resulting oil-clay mixture to a temperature of approximately 130° F. and mixing therewith at least an equal quantity of a liquefied normally gaseous hydrocarbon diluent in a mixing zone, thereby materially reducing the viscosity of the lubricating oil stock in contact with the clay, passing the resulting diluted mixture into a settling zone in which the particles of clay are rapidly separated from the diluted oil by settling, separately removing clay-free diluted oil and clay from the settling zone, maintaining a pressure in said zones sufficient to keep the diluent in liquid condition, and maintaining the temperature of the diluted lubricating oil stock in said zones only slightly below the boiling point of the diluent for the pressure used therein.

5. The process defined by claim 4 in which the clay separated in the settling zone and removed therefrom is mixed with a substantial proportion of a liquefied normally gaseous hydrocarbon to remove any occluded oil therefrom, separating the resulting washed clay from the diluent solution, removing the separated solution and mixing it with additional quantities of clay removed from said settling zone.

6. In the process of refining lubricating oil stocks in which the oil stock to be refined is mixed with a predetermined proportion of adsorbent clay and the resulting mixture heated in a continuous stream to the desired reaction temperature to effect the refining of the stock, the improvement which comprises mixing at least an equal quantity of a liquefied normally gaseous hydrocarbon diluent with the resulting refined mixture of oil stock and clay in a continuous operation at a temperature substantially above normal to dissolve the oil stock in the hydrocarbon diluent, maintaining the resulting diluted mixture at a temperature and superatmospheric pressure adapted to hold the normally gaseous hydrocarbon in liquid state in the mixture, passing the resulting mixture into a settling zone and settling out the clay therefrom, and separately removing clay-free diluted oil and settled clay from the settling zone.

7. In the process of refining residual lubricating oil stocks in which the oil stock to be refined is mixed with a predetermined proportion of adsorbent clay and the resulting mixture heated to the desired reaction temperature, the improvement which comprises mixing a substantial proportion of a liquefied normally gaseous hydrocarbon selected from the group consisting of propane, butane and mixtures thereof with the resulting mixture of oil stock and clay at a temperature substantially above normal to dissolve the oil stock in the said hydrocarbon, maintaining the resulting diluted mixture at a temperature and superatmospheric pressure adapted to hold the normally gaseous hydrocarbon in liquid phase, allowing the clay to settle out from the diluted mixture in a continuous settling operation in a settling zone, separately removing the clay-free diluted oil and the settled clay from the settling zone, and mixing a substantial proportion of a liquefied normally gaseous hydrocarbon with the clay removed from said settling zone to wash any occluded oil therefrom.

8. The process of refining lubrication oil stocks as defined by claim 4 in which the process is carried out continuously and in which the clay removed from the settling zone is mixed with a substantial proportion of a liquefied normally gaseous hydrocarbon under superatmospheric pressure to wash any occluded oil from the removed clay, settling the clay from the resulting diluted mixture in a second settling zone, passing the resulting clay-free wash liquid from said second settling zone and utilizing it to supply at least in part the hydrocarbon diluent mixed with the original oil-clay mixture.

9. The process of refining lubricating oil stocks as defined by claim 6, in which the clay removed from the settling zone is mixed with a substantial proportion of a liquefied normally gaseous hydrocarbon to wash any occluded oil therefrom, settling the clay from the resulting diluted mixture in a second settling zone, withdrawing clay-free diluent containing a relatively small proportion of oil from said second settling zone and utilizing the same to supply at least in part the liquefied normally gaseous hydrocarbon mixed with the original clay-oil mixture after being subjected to reaction temperatures.

10. In a continuous process for refining lubricating oil stocks in which the oil stock to be refined is mixed with the desired proportion of adsorbent clay and the resulting mixture heated in a stream to the desired reaction temperature, the improvement which comprises cooling the resulting mixture of oil stock and clay to a temperature which is substantially above normal, mixing a substantial proportion of a liquefied normally gaseous hydrocarbon with the resulting cooled mixture to dissolve the oil stock in said hydrocarbon, maintaining the resulting mixture at a superatmospheric pressure sufficient to hold the normally gaseous hydrocarbon in liquid phase, passing the resulting diluted mixture into a settling zone in which the clay is settled out from the diluted oil, separately removing the clay-free diluted oil and the settled clay from the settling zone, intimately mixing a substantial proportion of a liquefied normally gaseous hydrocarbon with the clay removed from said settling zone and passing the resulting mixture into a second settling zone in which the clay is settled from the liquefied normally gaseous hydrocarbon and dissolved oil, removing the settled clay from said second settling zone, withdrawing clay-free diluent containing dissolved oil from said second settling zone and utilizing a portion of the same to supply at least in part the liquefied normally gaseous hydrocarbon to be mixed with the original clay-oil mixture following said cooling operation, and utilizing another portion of said clay-free diluent to supply at least in part the liquefied normally gaseous hydrocarbon to be mixed with the clay removed from said first-mentioned settling zone.

11. In a continuous process for refining lubricating oil stocks in which the oil stock to be refined is mixed with the desired proportion of adsorbent clay and the resulting mixture heated in a stream to a desired temperature to effect the refining of the oil stock, the improvement which comprises passing the resulting mixture of refined oil stock and clay through a cooling zone in which the mixture is cooled to a substantially lower temperature but at which any wax content in the oil stock will remain in solution after a solvent is added to the oil, intimately mixing the cooled oil-clay mixture with at least an equal quantity of a hydrocarbon solvent selected from the group consisting of propane, butane and mixtures thereof thereby forming a solution of relatively low specific gravity and viscosity from the refined lubricating oil stock and hydrocarbon solvent, passing the resulting solution mixture into a precipitation zone and therein settling out clay from the oil solution which is recovered free of clay, and maintaining the temperature of the oil solution in the mixing and precipitation zones sufficiently high to keep the wax content of the lubricating oil stock in solution but sufficiently low to keep the solvent in liquid condition at the pressures maintained in said zones.

DAVID G. BRANDT.